United States Patent
Logue et al.

(10) Patent No.: US 8,234,371 B2
(45) Date of Patent: *Jul. 31, 2012

(54) FEDERATED CHALLENGE CREDIT SYSTEM

(75) Inventors: Jay D. Logue, San Jose, CA (US); Richard A. Landsman, Scotts Valley, CA (US); Timothy T. Sullivan, Portola Valley, CA (US); Phillip Y. Goldman, Los Altos, CA (US); Susan Rayl Goldman, legal representative, Los Altos, CA (US)

(73) Assignee: AOL Inc., Dulles, VA (US)

( * ) Notice: Subject to any disclaimer, the term of this patent is extended or adjusted under 35 U.S.C. 154(b) by 158 days.

This patent is subject to a terminal disclaimer.

(21) Appl. No.: 12/633,374

(22) Filed: Dec. 8, 2009

(65) Prior Publication Data

US 2010/0138444 A1 Jun. 3, 2010

Related U.S. Application Data (63) Continuation of application No. 11/098,333, filed on Apr. 4, 2005, now Pat. No. 7,647,381.

(51) Int. Cl.
G06F 15/16 (2006.01)
G06F 15/173 (2006.01)
(52) U.S. Cl. .......... 709/224; 709/203; 709/206
(58) Field of Classification Search .......... 709/203, 709/206, 224
See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |

(Continued)

OTHER PUBLICATIONS

U.S. Appl. No. 10/747,557, filed Dec. 29, 2003, Sullivan et al.

(Continued)

*Primary Examiner* — Larry Donaghue
(74) *Attorney, Agent, or Firm* — Finnegan, Henderson, Farabow, Garrett & Dunner, LLP (57) ABSTRACT

Systems and methods for reducing the number of challenge messages that are sent in response to an incoming message in situations where the incoming message is likely not unsolicited. The systems and methods include evaluating the behavior of a sender with regard to one or more federated messaging services and determining if the sender is approved or unapproved. If the sender is approved, the incoming message is deliver to a recipient's inbox without issuing a challenge message. Unapproved senders are required to respond to a challenge message.

8 Claims, 4 Drawing Sheets

U.S. PATENT DOCUMENTS

| | | | |
|---|---|---|---|
| 5,734,903 | A | 3/1998 | Saulpaugh et al. |
| 5,742,668 | A | 4/1998 | Pepe et al. |
| 5,742,769 | A | 4/1998 | Lee et al. |
| 5,781,857 | A | 7/1998 | Hwang et al. |
| 5,796,840 | A | 8/1998 | Davis |
| 5,826,022 | A | 10/1998 | Nielsen |
| 5,832,227 | A | 11/1998 | Anderson et al. |
| 5,835,722 | A | 11/1998 | Bradshaw et al. |
| 5,859,967 | A | 1/1999 | Kaufeld et al. |
| 5,884,033 | A | 3/1999 | Duvall et al. |
| 5,893,911 | A | 4/1999 | Piskiel et al. |
| 5,909,589 | A | 6/1999 | Parker et al. |
| 5,917,489 | A | 6/1999 | Thurlow et al. |
| 5,930,479 | A | 7/1999 | Hall |
| 5,937,162 | A | 8/1999 | Funk et al. |
| 5,999,600 | A | 12/1999 | Shin |
| 5,999,932 | A | 12/1999 | Paul |
| 5,999,967 | A | 12/1999 | Sundsted |
| 6,014,634 | A | 1/2000 | Scroggie et al. |
| 6,023,723 | A | 2/2000 | McCormick et al. |
| 6,052,709 | A | 4/2000 | Paul |
| 6,055,510 | A | 4/2000 | Henrick et al. |
| 6,057,841 | A | 5/2000 | Thurlow et al. |
| 6,073,142 | A | 6/2000 | Geiger et al. |
| 6,092,101 | A | 7/2000 | Birrell et al. |
| 6,112,227 | A | 8/2000 | Heiner |
| 6,154,765 | A | 11/2000 | Hart |
| 6,173,322 | B1 | 1/2001 | Hu |
| 6,182,118 | B1 | 1/2001 | Finney et al. |
| 6,189,026 | B1 | 2/2001 | Birrell et al. |
| 6,195,698 | B1 | 2/2001 | Lillibridge et al. |
| 6,199,102 | B1 | 3/2001 | Cobb |
| 6,199,106 | B1 | 3/2001 | Shaw et al. |
| 6,205,432 | B1 | 3/2001 | Gabbard et al. |
| 6,226,372 | B1 | 5/2001 | Beebe et al. |
| 6,230,188 | B1 | 5/2001 | Marcus |
| 6,237,027 | B1 | 5/2001 | Namekawa |
| 6,249,807 | B1 | 6/2001 | Shaw et al. |
| 6,266,692 | B1 | 7/2001 | Greenstein |
| 6,282,565 | B1 | 8/2001 | Shaw et al. |
| 6,349,328 | B1 | 2/2002 | Haneda et al. |
| 6,356,935 | B1 | 3/2002 | Gibbs |
| 6,366,950 | B1 | 4/2002 | Scheussler et al. |
| 6,373,950 | B1 | 4/2002 | Rowney |
| 6,393,465 | B2 | 5/2002 | Leeds |
| 6,421,709 | B1 | 7/2002 | McCormick et al. |
| 6,457,044 | B1 | 9/2002 | IwaZaki |
| 6,460,074 | B1 | 10/2002 | Fishkin |
| 6,484,197 | B1 | 11/2002 | Donohue |
| 6,546,416 | B1 | 4/2003 | Kirsch |
| 6,587,550 | B2 | 7/2003 | Council et al. |
| 6,625,257 | B1 | 9/2003 | Asaoka et al. |
| 6,640,301 | B1 | 10/2003 | Ng |
| 6,671,718 | B1 | 12/2003 | Meister et al. |
| 6,678,704 | B1 | 1/2004 | Bridge, Jr. et al. |
| 6,691,156 | B1 | 2/2004 | Drummond et al. |
| 6,708,205 | B2 | 3/2004 | Sheldon et al. |
| 6,748,422 | B2 | 6/2004 | Morin et al. |
| 6,856,963 | B1 | 2/2005 | Hurwitz |
| 6,868,498 | B1 | 3/2005 | Katsikas |
| 6,880,088 | B1 | 4/2005 | Gazier et al. |
| 6,883,095 | B2 | 4/2005 | Sandhu et al. |
| 6,910,034 | B2 * | 6/2005 | Sasaki et al. ............... 1/1 |
| 6,957,770 | B1 * | 10/2005 | Robinson ............ 235/382 |
| 7,039,949 | B2 | 5/2006 | Cartmell et al. |
| 7,043,753 | B2 | 5/2006 | Roddy et al. |
| 7,065,341 | B2 | 6/2006 | Kamiyama et al. |
| 7,076,533 | B1 | 7/2006 | Knox et al. |
| 7,085,925 | B2 | 8/2006 | Hanna et al. |
| 7,120,927 | B1 | 10/2006 | Beyda et al. |
| 7,136,897 | B1 | 11/2006 | Raghunandan |
| 7,185,194 | B2 | 2/2007 | Morikawa et al. |
| 7,185,359 | B2 | 2/2007 | Schmidt et al. |
| 7,188,358 | B1 | 3/2007 | Hisada et al. |
| 7,263,545 | B2 | 8/2007 | Digate |
| 7,287,060 | B1 * | 10/2007 | McCown et al. ......... 709/206 |
| 7,346,696 | B2 | 3/2008 | Malik |
| 7,359,941 | B2 * | 4/2008 | Doan et al. ............... 709/205 |
| 7,366,761 | B2 * | 4/2008 | Murray et al. ............ 709/206 |
| 7,383,433 | B2 | 6/2008 | Yeager et al. |
| 7,512,788 | B2 | 3/2009 | Choi et al. |
| 7,594,272 | B1 * | 9/2009 | Kennedy et al. ............ 726/24 |
| 7,610,344 | B2 * | 10/2009 | Mehr et al. ............... 709/206 |
| 7,835,294 | B2 * | 11/2010 | Shuster .................... 370/252 |
| 2002/0042815 | A1 | 4/2002 | Salzfass et al. |
| 2002/0046099 | A1 | 4/2002 | Frengut et al. |
| 2002/0046250 | A1 | 4/2002 | Nassiri |
| 2002/0099781 | A1 | 7/2002 | Scheussler et al. |
| 2002/0107856 | A1 | 8/2002 | Scheussler et al. |
| 2002/0116263 | A1 * | 8/2002 | Gouge ....................... 705/14 |
| 2002/0116641 | A1 | 8/2002 | Mastrianni |
| 2002/0147726 | A1 | 10/2002 | Yehia et al. |
| 2002/0152272 | A1 | 10/2002 | Yairi |
| 2002/0194308 | A1 | 12/2002 | Hall |
| 2002/0199095 | A1 | 12/2002 | Bandini et al. |
| 2003/0009698 | A1 | 1/2003 | Lindeman et al. |
| 2003/0023736 | A1 | 1/2003 | Abkemeier |
| 2003/0030680 | A1 | 2/2003 | Cofta et al. |
| 2003/0037103 | A1 | 2/2003 | Salmi et al. |
| 2003/0037250 | A1 | 2/2003 | Walker et al. |
| 2003/0065926 | A1 | 4/2003 | Schultz et al. |
| 2003/0081621 | A1 | 5/2003 | Godfrey et al. |
| 2003/0086543 | A1 | 5/2003 | Raymond |
| 2003/0097597 | A1 | 5/2003 | Lewis |
| 2003/0110400 | A1 | 6/2003 | Cartmell et al. |
| 2003/0163691 | A1 | 8/2003 | Johnson |
| 2003/0167311 | A1 | 9/2003 | Kirsch |
| 2003/0167402 | A1 | 9/2003 | Stolfo et al. |
| 2003/0172167 | A1 * | 9/2003 | Judge et al. ............... 709/229 |
| 2003/0191969 | A1 | 10/2003 | Katsikas |
| 2003/0196116 | A1 | 10/2003 | Troutman |
| 2003/0200267 | A1 | 10/2003 | Garrigues |
| 2003/0233418 | A1 | 12/2003 | Goldman |
| 2003/0236847 | A1 | 12/2003 | Benowitz et al. |
| 2004/0003283 | A1 | 1/2004 | Goodman et al. |
| 2004/0015554 | A1 | 1/2004 | Wilson |
| 2004/0054887 | A1 | 3/2004 | Paulsen, Jr. et al. |
| 2004/0087300 | A1 | 5/2004 | Lewis |
| 2004/0111480 | A1 | 6/2004 | Yue |
| 2004/0143633 | A1 | 7/2004 | McCarty |
| 2004/0145773 | A1 * | 7/2004 | Oakeson et al. ............ 358/1.15 |
| 2004/0148358 | A1 | 7/2004 | Singh et al. |
| 2004/0167941 | A1 | 8/2004 | Prahlad et al. |
| 2004/0181581 | A1 | 9/2004 | Kosco |
| 2004/0199595 | A1 | 10/2004 | Banister et al. |
| 2004/0236835 | A1 | 11/2004 | Blankenship |
| 2004/0236838 | A1 | 11/2004 | Tout |
| 2004/0243676 | A1 | 12/2004 | Blankenship |
| 2004/0243698 | A1 | 12/2004 | Blankenship |
| 2005/0015455 | A1 * | 1/2005 | Liu ........................... 709/207 |
| 2005/0015481 | A1 | 1/2005 | Blankenship |
| 2005/0015482 | A1 | 1/2005 | Blankenship |
| 2005/0076220 | A1 * | 4/2005 | Zhang et al. ............... 713/176 |
| 2005/0076221 | A1 | 4/2005 | Olkin et al. |
| 2005/0076222 | A1 | 4/2005 | Olkin et al. |
| 2005/0081059 | A1 | 4/2005 | Bandini et al. |
| 2005/0188045 | A1 | 8/2005 | Katsikas |
| 2005/0204012 | A1 * | 9/2005 | Campbell .................. 709/206 |
| 2005/0276234 | A1 * | 12/2005 | Feng et al. ................ 370/260 |
| 2006/0031338 | A1 * | 2/2006 | Kang et al. ............... 709/206 |
| 2006/0053203 | A1 * | 3/2006 | Mijatovic ................. 709/206 |
| 2006/0059238 | A1 | 3/2006 | Slater et al. |
| 2006/0101021 | A1 | 5/2006 | Davis et al. |
| 2006/0112165 | A9 | 5/2006 | Tomkow et al. |
| 2006/0168048 | A1 | 7/2006 | Lyle et al. |
| 2006/0212520 | A1 | 9/2006 | Logue et al. |
| 2006/0242244 | A1 | 10/2006 | Logue et al. |
| 2007/0016641 | A1 | 1/2007 | Broomhall |
| 2008/0162926 | A1 | 7/2008 | Xiong et al. |

OTHER PUBLICATIONS

U.S. Appl. No. 11/017,461, filed Dec. 20, 2004, Landsman.

* cited by examiner

| Sender ID | Time Stamp | Service 1 | Service 2 | Service 3 |
|---|---|---|---|---|
| Email 1 | 12:00 1/5/03 | 200 | 5 | 72 |
| Email 2 | 2:58 7/16/04 | 18 | 20,000 | 16 |
| Email 3 | 23:19 8/2/04 | 90 | 83 | 0 |

Fig. 2B

| Sender ID | Time Stamp | Service 1 | Service 2 | Service 3 |
|---|---|---|---|---|
| Email 1 | 20:49 8/3/04 | 201 | 104 | 88 |
| Email 2 | 2:58 7/16/04 | 18 | 20,000 | 16 |
| Email 3 | 23:19 8/2/04 | 90 | 83 | 0 |

Fig. 2C

| Sender ID | Time Stamp | Δ Service 1 | Δ Service 2 | Δ Service 3 |
|---|---|---|---|---|
| Email 1 | | 1 | 99 | 16 |
| Email 2 | | 0 | 0 | 0 |
| Email 3 | | 0 | 0 | 0 |

Fig. 3

| Sender ID | Time Stamp | Service 1 | Flag Service 1 | Flag Service 2 | Flag Service 3 |
|---|---|---|---|---|---|
| Email 1 | 20:49 8/3/04 | 200 | 0 | 0 | 1 |
| Email 2 | 2:58 7/16/04 | 18 | 1 | 0 | 1 |
| Email 3 | 23:19 8/2/04 | 90 | 1 | 1 | 1 |

Fig. 4

FEDERATED CHALLENGE CREDIT SYSTEM

This application is a continuation of U.S. application Ser. No. 11/098,333, filed Apr. 4, 2005 and entitled "Federated Challenge Credit System," which application is hereby incorporated by reference in its entirety for all purposes.

BACKGROUND OF THE INVENTION

1. The Field of the Invention

The present invention relates generally to systems and methods for delivering electronic messages. More particularly, embodiments of the invention relate to evaluating behavioral information about senders of incoming messages and determining whether to allow incoming messages from approved senders to be delivered directly to a recipient's inbox.

2. The Relevant Technology

Electronic messaging or e-mail has become, for many people, a primary means of communication. The ease by which a person is able to send and receive an electronic message makes this form of communication extremely attractive. Unfortunately, others utilize electronic messaging to send unsolicited bulk electronic messages, better known as "spam." Unsolicited electronic messages may include commercial advertisements, political messaging, as well as pornographic solicitations. Due to the influx of unsolicited electronic messages, people have become wary of giving out their electronic addresses for fear that their address will be sold to would-be solicitors. Further, those who receive spam are often not able to successfully request removal from mass e-mailing lists. Moreover, it is difficult to ascertain who has sent unsolicited electronic messages, since solicitors often use fabricated addresses or refrain from including one altogether.

Challenge and response mechanisms have been developed as a way to filter out unwanted electronic messages. When an electronic message is directed to a recipient, the message is delivered to the recipient only if the sender is identified as being authorized to send electronic messages to the recipient. Usually, the recipient has a list of approved senders, allowing the electronic message from the approved senders to be sent to the recipient's inbox without a challenge.

However, when the sender is unknown, a challenge message is sent to the sender to verify that the sender's address is valid and that the sender is a person as opposed to a machine before delivering the sender's email to the recipient's inbox. The sender is confirmed by asking the sender to respond to the challenge message in a way that affirmatively verifies that the sender is a person as opposed to a machine. This challenge/response method is quite successful in eliminating unsolicited electronic messages that are sent by mass-mailers.

However, challenge/response systems are based on a set of rules that do not take into consideration certain scenarios and situations in which it is likely that a sender is sending a legitimate email message and it is likely that a recipient would actually like to receive an incoming message from the sender. In these situations, the challenge/response system is over inclusive, meaning that the spam protection actually prevents wanted messages from being sent directly to the recipient.

BRIEF SUMMARY OF THE INVENTION

The present invention relates to making network communication more efficient by reducing the number of challenge messages that are issued. Challenge messages are typically issued to verify that the sender of an incoming message is a human before the incoming message can be delivered to a recipient's inbox. In some cases, challenge wars can occur where two crossing challenge messages are never responded to. Thus, the present invention provides for withholding challenge messages in situations where it is likely that the sender is not sending unsolicited messages.

Embodiments of the invention include identifying the sender of an incoming message and determining the behavior of the sender with respect to one or more federated messaging services. Federated messaging services generally have the ability to store behavioral information with regard to one or more senders. In addition, at least some federated messaging services are able to analyze the behavioral information of a sender with regard to one or more federated services to determine if the sender is approved or unapproved. If the sender is approved, a challenge message is withheld and the incoming message allowed to be sent directly to a recipient's inbox. Unapproved senders are issued a challenge message to which they must respond before the incoming message will be delivered to a recipient's inbox. Federated messaging services are associated with a server that can contain a behavioral evaluation module and/or a behavioral evaluation module to carry out these and other functions.

These and other features of the present invention are described in further detail below and in the appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The present invention relates to challenge/response electronic messaging systems and methods for delivering incoming messages from a sender to a recipient's inbox in situations where the sender has exhibited behavior that indicates that the sender is likely not sending unsolicited messages. Senders who exhibit behavior indicating that the sender is likely not a spammer are referred to as "approved senders." Approved senders can become unapproved senders should they begin to exhibit behavior or trends which are considered closer to spamming than acceptable electronic messaging. Where the sender is considered well behaved or "approved," an incoming message from the sender is delivered to a recipient's inbox without applying normal filtering mechanism protocols.

For example, messaging systems implementing challenge/response mechanisms normally send challenge messages to each unidentified sender. Under the present invention, an unidentified sender could be considered to be an approved sender, wherein a challenge message is withheld and the incoming message is sent directly to a recipient's inbox. In another example, a previously identified sender may have had challenge messages withheld but begins to send a large number of electronic messages to one or more messaging services. In this situation, one or more of the message services may change the sender's status to unapproved and begin sending challenge messages to the sender as the sender's behavior indicates that there is a likelihood that the sender is sending unsolicited electronic messages.

Advantageously, the present invention simplifies the exchange of electronic messages, while still allowing filtering mechanisms to be implemented when it is likely that the sender is sending spam messages. Furthermore, embodiments of the present invention can be used to avoid "challenge wars" which can occur when two messaging services send crossing challenge messages and where the crossing challenge messages are delivered to pending folders or are deleted on each messaging service so that both parties are unaware of the challenge event. That is, in situations where a sender is approved, challenge messages are not sent in response to the sender's incoming message so that the possibility of a challenge war is eliminated. This is because where a sender is approved, it is likely that the sender is not acting like a spammer so that challenge messages do not need to be sent to block the sender's messages.

Furthermore, embodiments of the present invention provide that the behavior of a sender can be monitored across two or more messaging services so that, for example, a sender does not receive challenge messages from a messaging service if two or more messaging services agree that the sender is approved. Thus, the two or more messaging services are "federated." As used herein, the term "federated messaging service" refers to a messaging service that has implemented systems and protocols which allows a federated messaging service to monitor the behavior of one or more senders and/or determine, based on that behavior, whether a filtering mechanism should be modified in order to allow incoming messages from the sender to be sent to a recipient's inbox associated with the messaging service. The federated messaging service can also interact with other federated messaging services in order to determine whether to issue a challenge message or deliver the incoming message to the recipient's inbox.

Details of the network environment and transfer of behavioral information, and examples illustrating the present invention are provided as follows.

1. Computer Environment and Data Structure of Authorized Challenge Messages

Figure 1:
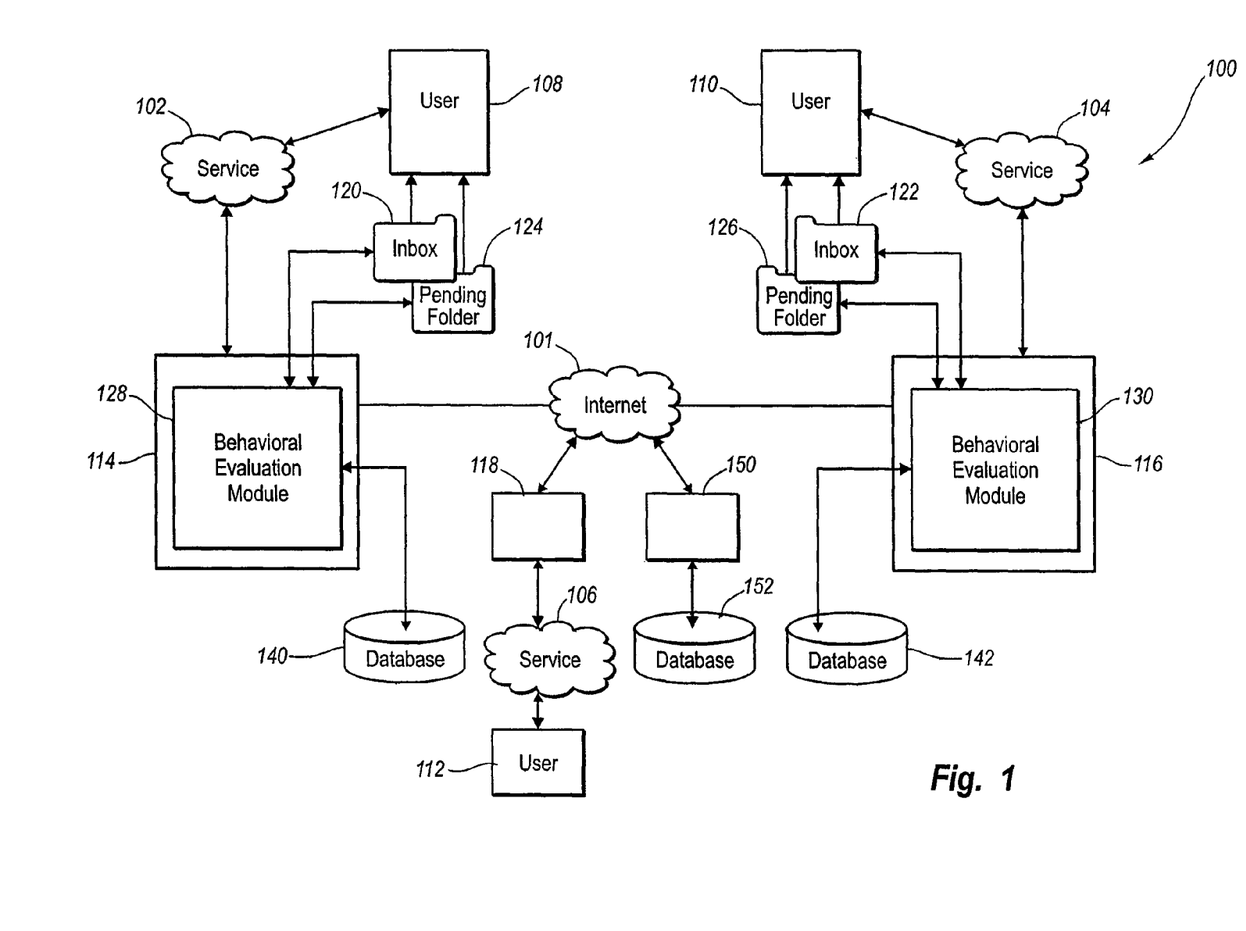
FIG. 1 illustrates an exemplary network environment for implementing embodiments of the present invention.

Turning to FIG. 1, an exemplary network system 100 is illustrated in which one or more users are able to send electronic messages to each other via, e.g., the Internet 101. System 100 includes messaging services 102, 104, 106, each including client devices or user computers 108, 110, 112, respectively, each device representing a user. Each messaging service 102, 104, 106 includes, respectively, servers 114, 116, 118 which act as portals for outgoing and incoming challenge messages and other electronic messages to and from one service to another. Each server 114, 116, 118 can be connected to each other via, for example, the Internet 101. The servers 114, 116, and 118 may be, for example SMTP servers.

As used herein, the term "messaging service" refers to a system which provides electronic messaging capabilities to one or more users. Each messaging service 102, 104, 106 is generally identified by a different domain name. Each domain name is associated with one or more servers (each having an IP address). Thus, users associated with a particular messaging service will use a common domain name, but may send and receive electronic messages through multiple servers associated with the domain name. Each messaging service 102, 104, 106 thus can include one or more servers, with servers 114, 116, 118 being representative only of one of the servers associated with a domain name. Messaging services 102, 104, 106 can be an intranet, local area network (LAN), or wide area network (WAN) or any network of any size.

It will be appreciated that each server 114, 116, 118 can include the processors, databases, software, and memory required in order to fully implement a messaging system. This may include a filtering mechanism for identifying and filtering potential spam messages. Each user computer 108, 110, 112 may also include messaging programs which generate and otherwise handle electronic messages locally for each user. For example, each user computer 108, 110 can include an inbox 120, 122 and a pending folder 124, 126, respectively. Server 114, 116 can filter electronic messages and send them to the inbox or pending folder accordingly. As used herein, the term "electronic message" generally refers to an electronic message in any format such as, but not limited to, e-mail, voice mail, voice-over-IP, text messaging, instant messaging, and the like.

As defined above, one aspect of federated messaging services includes systems and protocols for determining the behavior of a sender. Thus, in one embodiment of FIG. 1, messaging services 102, 104 are "federated messaging services" since they contain behavioral evaluation modules 128, 130 respectively, that can be implemented in, for example, servers 114 and 116, respectively. In contrast, messaging service 106 may also be a federated messaging service but is not shown as such to also illustrate that the present invention can be implemented between federated and non-federated messaging services.

Behavioral evaluation modules 128, 130 provide protocols for receiving, sending and/or storing behavioral information regarding senders and the electronic messages sent by the senders. The behavioral information can include data about one or more senders and the electronic messages that are transmitted to a particular federated messaging service. This information may also include protocols for transmitting requests to other federated messaging services for behavioral information and receiving responses to such requests. Behavioral information is stored on databases 140, 142. In addition, the behavioral evaluation modules 128, 130 include protocols for responding to requests from other federated messaging services for behavioral information. Behavioral evaluation modules 128, 130 also provide protocols for evaluating the behavioral information stored in databases 140, 142. Behavioral evaluation modules 128, 130 apply predetermined criteria for determining whether a sender should be considered approved or unapproved. The criteria for determining whether a sender should be considered approved or unapproved can also be determined dynamically Behavioral evaluation modules 128, 130 also communicate with the filtering mechanism or filtering protocol (not shown) in server 114, 116 to modify the filtering mechanism so that it does not block incoming electronic messages for approved senders.

In one embodiment, all of servers 114, 116, 118 provide electronic messaging services using a challenge/response filtering system. The challenge/response protocol can be any configuration known in the art. Generally, challenge/response protocols use challenge messages that require a human response to determine whether an unidentified sender is human as opposed to a machine by requiring the sending entity to perform a specified task that a machine is unlikely to be capable of performing. Examples of suitable challenge/response systems that can be adapted for use with the methods disclosed herein are described in U.S. patent application Ser. No. 10/174,561, filed Jun. 18, 2002 and U.S. Pat. No. 6,199,102, issued Mar. 6, 2001, both of which are incorporated herein by reference.

However, other embodiments are contemplated in which only some of servers 114, 116, 118 implements a challenge/response filtering mechanism and the other server(s) includes another spam filtering mechanism including, but not limited to, address or white lists, or other mechanisms which sends messages from unidentified senders to a pending folder. Thus, while the present invention is directed to reducing the number of challenge messages generated by challenge/response systems, for example, where all of servers 114, 116, 118 include a challenge/response system, the present invention may also be used to avoid the situation where the challenge is unidirectional.

So, for example, server 114 of messaging service 102 can implement a challenge/response system and can include a behavioral evaluation module that can evaluate the behavioral information of senders of incoming messages to determine if the incoming message warrants a challenge message. Meanwhile, server 116 of messaging service 104 implements authorized address lists to filter unwanted mail and can include only a behavioral evaluation module that can store and transmit sender behavioral information, but does not evaluate whether a challenge message should be sent in response to incoming messages transmitted to server 116. Thus, it will be appreciated that various configurations for implementing the present invention may be possible.

Turning back to FIG. 1, when server 114 receives an incoming message the incoming message is processed by behavioral evaluation module 128. Behavioral evaluation module 128 of server 116 evaluates the incoming message to determine the identity of the sender. For example, this can be the sender's email address, phone number, or other identifying information. Sender behavioral information is parsed from the incoming message by behavioral evaluation module 128 and maintained in databases 140. If this is the first time the sender has sent incoming messages to server 114, the sender's name is added to the list of senders in database 140. If the sender has sent incoming messages previously to server 114, the database 140 updates the count of the number of incoming messages from that sender by one.

In some embodiments, the behavioral evaluation module 128 will only maintain information based on incoming messages received by server 114 and its only function is to maintain sender behavioral information and transmit that information to other federated messaging services. It is also possible that in one embodiment, behavioral evaluation module 128 may use only the behavioral information based on incoming messages sent only to server 114.

However, generally, behavioral evaluation module 128 will maintain and use behavioral information on a particular sender retrieved from one or more other federated messaging services to determine if a sender's incoming message should be allowed to go to the recipient's inbox without issuing a challenge. This includes behavioral evaluation module 128 on server 114 requesting information from federated servers 116, 118 to obtain behavioral information on one or more senders. In one embodiment, requests for behavioral information from other federate messaging services can be sent in the form of an electronic message. Similarly, responses to requests can be sent as electronic messages. As will be discussed below, a certificate authorizing server 150 communicating with a database 152 can be used to secure communications between federated messaging services. Once the behavioral information from servers 116, 118 is received, the behavioral evaluation module 128 updates database 140 with new behavioral information. The database 140 can be updated in response to an electronic message from a sender, periodically, or in any other manner.

Behavioral evaluation module 128 then analyzes the updated information or changes between the old behavioral information and updated behavioral information to determine if the sender is an approved or unapproved sender, although the behavioral evaluation module 128 can rely on existing behavioral information when necessary. Based on this determination, behavioral evaluation module 128 communicates with the filter module to inform whether or not to issue a challenge message. That is, if the sender is determined to be an unapproved sender, the behavioral evaluation module 128 allows a challenge message to be sent as normal. However, if the sender is an approved sender, the behavioral evaluation module 128 communicates with the challenge/response module to prevent a challenge message from being issued and allows the incoming message to be sent directly to the recipient's inbox.

Thus, the present invention allows an approved sender to send messages to a federated messaging service without actually requiring a challenge, yet still retains the benefits of challenge/response systems for unapproved senders to eliminate or reduce spam.

2. Maintaining and Using Behavioral Information

One aspect of the present invention is to allow federated messaging services to collaborate and share behavioral information to assist the various federated messaging services in determining whether a sender is approved or unapproved. This is beneficial, for instance, because a sender may act differently with regard to one messaging service than another. Furthermore, in some cases, a federated messaging service may receive an incoming message from a new sender and may want to determine how the sender has behaved with regards to other messaging services before allowing the incoming message to automatically be allowed to go into the recipient's inbox.

Figure 2A:
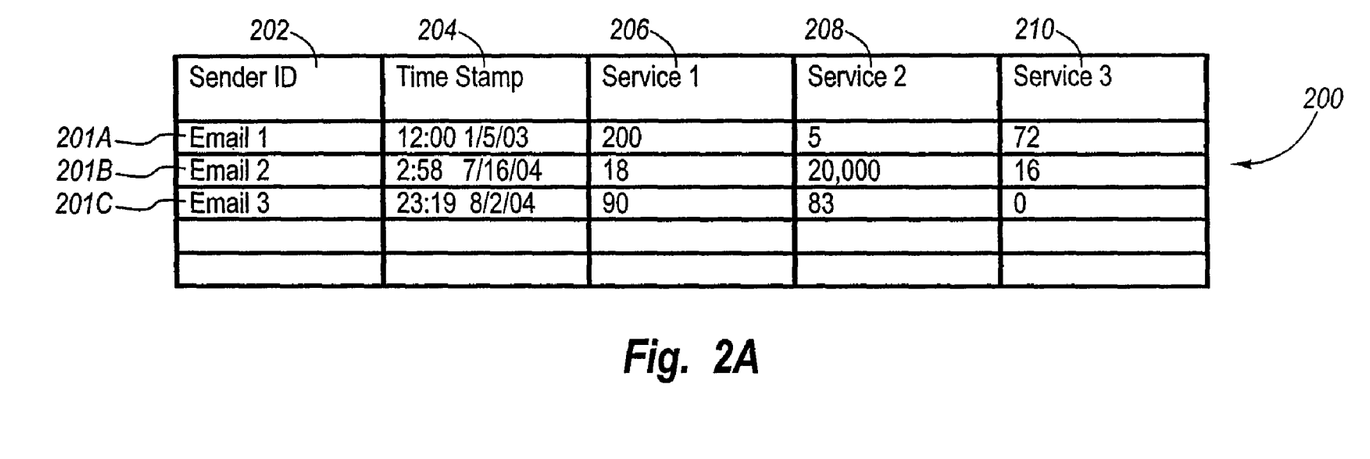
FIGS. 2A through 2C illustrate exemplary data structures for use in embodiments of the present invention.
Figure 2B:
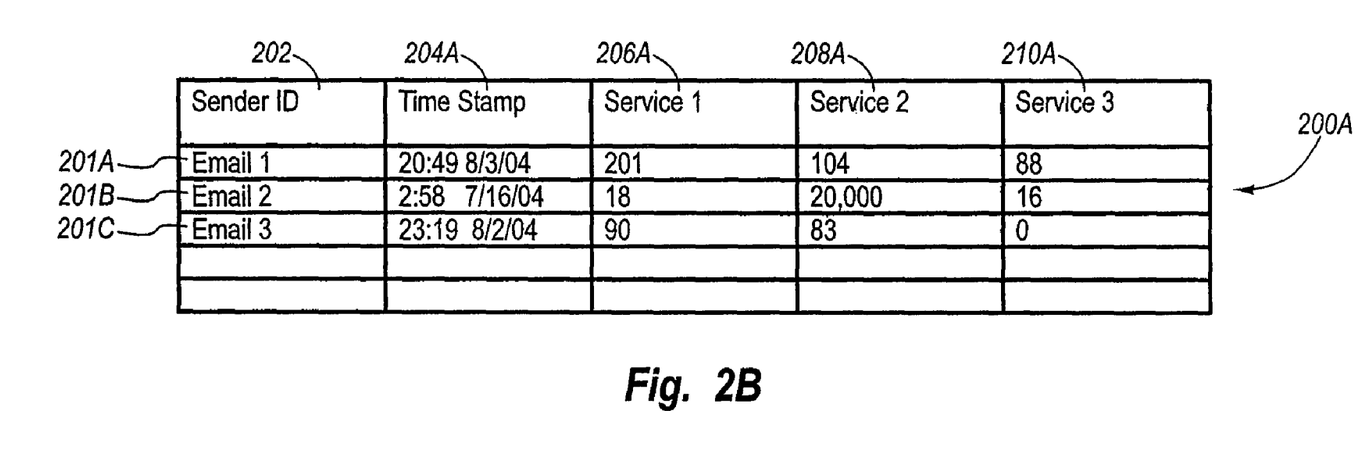
Figure 2C:
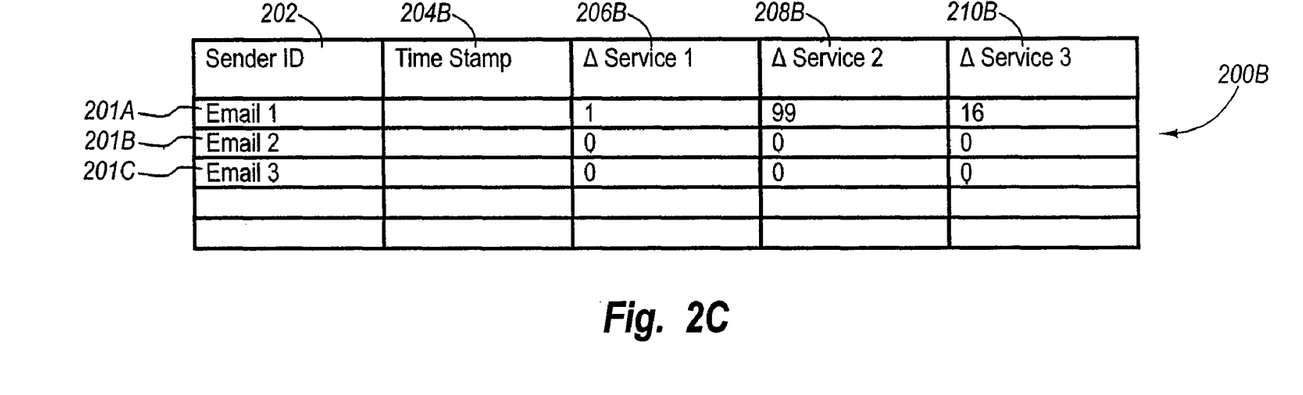
Figure 3:
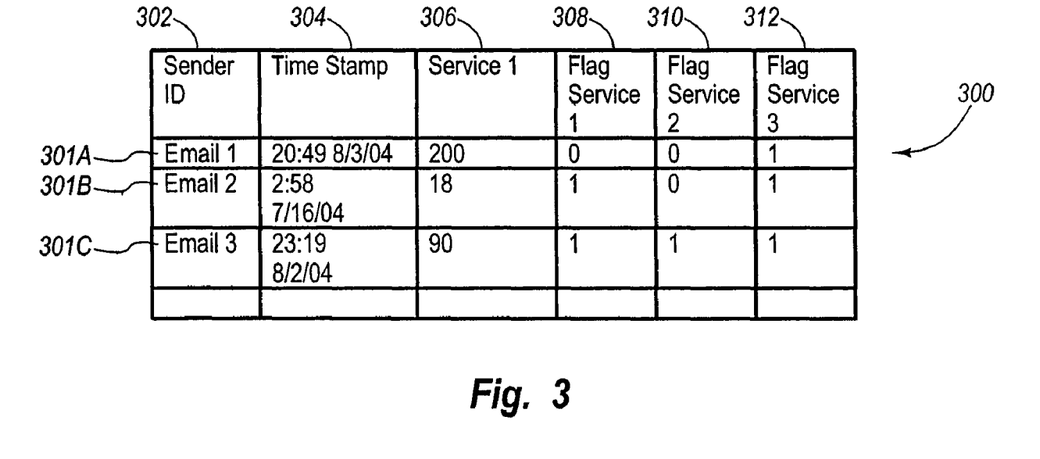
FIG. 3 illustrates another exemplary data structure of the present invention.

Generally, behavioral evaluation modules 128, 130 communicate with a database 140, 142, respectively to store behavioral information of senders. In addition, the federated messaging service stores information retrieved from other federated messaging services in the database. With reference to FIGS. 2A through 3, exemplary data structures are shown in which sender behavioral information can be stored. As used herein, the term data structure is used to refer to any data structure for formatting, organizing and/or storing data. Data structures include but are not limited to, arrays, files, records, tables, trees, and the like. It will be appreciated that any of these data structures can be applied to the present invention to organize data so that it can be accessed and worked with in appropriate ways. Further, it will be appreciated that the type of information stored in the data structure will vary depending on whether the federated messaging service maintains behavioral information and/or how the behavioral information is analyzed.

FIG. 2A thus illustrates a table data structure 200 to store sender behavioral information. Data structure 200 includes columns for at least each sender (shown as senders 201A, 201B and 201C) that transmits messages to a particular federated messaging service. In embodiments where updates are received including information about senders who have not yet sent a message to that particular federated messaging service, data structure 200 can still store this information as well. Structure 200 includes a column 202 for maintaining sender identification information (e.g., email addresses), a column 204 for maintaining time stamp information for when the sender's information was last updated, and columns 206, 208, 210 for maintaining behavioral information on a particular sender from a first, second and third federated messaging service. Depending on the method used to determine a sender's approved or unapproved status, the information maintained in columns 206, 208, 210 may differ.

For example, assuming that the information is being stored on database 140 of service 102, behavioral information for senders transmitting electronic messages to service 102 is stored in column 206. Columns 208, 210 contain behavioral information for senders transmitting electronic messages to a second messaging service and a third messaging service, respectively. As shown in FIG. 2A, columns 206, 208, 210 indicate the number of messages received from each sender at each messaging service. Information in columns 208, 210 can be obtained using the behavioral evaluation module 128 to request and receive that information from another federated messaging service. In one embodiment, the server may only keep enough information to give each sender a score that can be used to determine whether a sender is approved or unapproved. The score for a particular federated messaging service can be based on information from electronic messages sent to that federated messaging service and/or information obtained from electronic messages sent to other federated messaging services.

The behavioral evaluation module 128 can request updated behavioral information from the second and third messaging service at any time. For example, when a new incoming message is received from, for example, the first sender identified in column 202, the behavioral evaluation module 128 obtains updated behavioral information from the second and third messaging services for that sender. The updated behavioral information can include only updated information for an identified sender. This can be advantageous in that responses to requests for updated information will only contain information relevant to senders that send messages to that particular federated messaging service. In another embodiment, the response may include a list of any updates to any of the senders for whom messages were received at the second or third federated messaging service 104, 106. Still, in another embodiment, the response may include a list of all senders, regardless of any changes, although this embodiment can slow down the processing speed by which the database 140 is updated.

FIG. 2B illustrates an updated database structure 200A with columns 202 maintaining the sender ID column 202, time stamp column 204A, and behavioral information columns 206A, 208A, 210A for first, second and third federated messaging services. FIG. 2B can represent that the updated information is copied over the old behavioral information in FIG. 2A. Alternatively, FIG. 2B can represent that the updated information is stored in database 140 in addition to the old behavioral information to be used for comparative analysis.

FIGS. 2A and 2B illustrate one embodiment in which the criteria of whether to initiate challenge messages is based on a certain number of messages received by the sender. In other words, the decision is based on a predetermined threshold number of email messages. Behavioral evaluation module 128 maintains a count of the number of messages received from each sender. In addition, by requesting behavioral information from other federated messaging services, the behavioral evaluation module can keep track of the number of messages that that sender is sending to other federated messaging services. Using this information, behavioral evaluation module 128 can calculate a total of the number of email messages combined for the three federated messaging services and compare the total to a threshold value. If the total is below the threshold value, then the behavioral evaluation module 128 communicates with the challenge/response module to withhold a challenge message. If the total exceeds the threshold value, then a challenge message is issued as normal. In this embodiment the updated information could simply overwrite the old information since the count is based on the most up to date information. This reduces the amount of storage space required to maintain behavioral information.

The following example will illustrate how this method operates. In this example, federated messaging service 102 has as a threshold value 1000 messages that a sender can transmit to all of the federated messaging services combined. Sender 201A has been identified in association with an electronic message sent to federated messaging service 102. Federated messaging service 102 subsequently obtained updated behavioral information for at least senders 201A as reflected in FIG. 2B. With regard to sender 201A, behavioral evaluation module 128 would calculate a total of 393 electronic messages sent by sender 201A to all three federated messaging services combined. Because the total of 393 messages falls below the threshold value of 1000 email messages, the behavioral evaluation module 128 would identify sender 201A as an approved sender and would allow the electronic message associated with sender 201A to be sent to the recipient's inbox without issuing a challenge message. The threshold can also represent electronic messages sent within a certain time period, such as a month for example.

FIGS. 2A through 2C illustrate another embodiment in which the criteria depends on a comparative analysis of the number of messages that are being sent now compared to the last updated information. As mentioned above, FIG. 2A represents a prior state of messaging of senders 201A, 201B and 201C while FIG. 2B represents an updated state. FIG. 2C thus shows that behavioral evaluation module 128 can create a third data structure 200B which represents the changes in the present (FIG. 2B) and prior (FIG. 2A) states. The behavioral evaluation module 128 can store both prior and present data tables and create a third data structure 200B containing the comparison information. Alternatively, behavioral evaluation module 128 could analyze the comparison information as the information is received and create a comparison table. It could also rewrite the prior information with the updated information simultaneously with analyzing the information so that the database 140 contains only the most updated information. In any event, columns 206B, 208B, 210B in FIG. 2C reflect the change in number of email messages sent by a sender rather than a cumulative number of messages.

In an example illustrating this embodiment, assume that the threshold value for federated messaging service 102 is Δ100 messages from the previous predetermined event to a present event. The predetermined event could be a fixed periodic time period, for example, 15 minutes. Behavioral evaluation module 128 would calculate a total in the change (Δ) in number of messages in columns 206, 208, 210 for a particular sender. For example, for sender 201A, the change in total number of messages sent to all the federated messaging services is 116 messages. Thus, in contrast to the previous example, the sender 201A would be issued a challenge message because the change in the number of email messages sent by the sender 201A to all of the federated messaging services has increased above the threshold level.

FIG. 3 illustrates yet another embodiment of a method for evaluating behavioral information for senders where the criteria operates on a flag or binary indicator which operates to indicate whether a sender is provisionally approved or unapproved at each federated messaging service. As used herein, the term "provisionally approved or unapproved" is used to refer to the fact that the ultimate decision of whether to send a challenge message in response to a sender's incoming message at a particular federated messaging service is generally based on an analysis of two or more federated messaging services. Thus, the flag or binary indicator servers as a behavioral indicator of whether each federated messaging service considers the sender well behaved or not. For example, a "1" may indicate that a sender is considered provisionally approved at a particular federated messaging service, but is provided with the understanding that the requesting federated messaging service will likely base the ultimate decision on more than just that federated messaging service and that the sender's behavior may be considered spamming as to other federated messaging services.

In this embodiment, a data structure 300 can be stored in, for example, database 140 containing column 302 identifying the sender (e.g., senders 301A, 301B, 301C), column 304 providing a time stamp, and column 306 tracking the number of messages that a first messaging service receives from the identified senders. In addition, data structure 300 includes columns 308, 310, 312 in which behavioral information is expressed as a flag or binary numeral such as "1" for approved sender and "0" for unapproved sender.

Generally, a first federated messaging service, for example, service 102, tracks the number of messages received from each sender in a data structure 300 in column 306. Based on a threshold value determined by that particular federated messaging service, the behavioral evaluation module 128 determines whether or not to identify the sender with a "0" or "1" flag, which is maintained in column 308. Behavioral evaluation module 128 also requests behavioral information from other federated messaging services, in this example, second and third messaging services. However, the behavioral information is provided in the form of a binary indicator "0" or "1." The flag or binary indicator for the other federated messaging services is stored in columns 310 and 312. Behavioral evaluation module 128 then analyzes the various ratings across all services for a particular sender to determine if that sender is approved or unapproved.

It will be appreciated that yes/no flags or binary indicators provide a simple analysis of approval of a sender. If, for example, any of the rating for an identified sender indicates a "0", then the ultimate rating is a "0," indicating an unapproved sender. If all of the ratings are a "1", then the ultimate rating is a "1," indicating an approved sender. This method allows each federated messaging services to base the rating flag on separate criteria, if desired. Furthermore, this method eliminates threshold values and reduces the determination to a simple binary function.

Many factors can be used in determining whether a particular federated messaging service gives a rating of "1" or a rating of "0" to a particular sender. These factors include, but are not limited to, how many electronic messages the sender sends in a given time period, how long it takes to generate each electronic message, what time of day the electronic messages are sent, how the content varies from one electronic message to the next, characteristics that suggest the electronic message was generated by a person, and the like or any combination thereof. In addition, the rating, rather than being a binary flag, can also be a score, for example, in a given range (0 to 100, for example). This enables a federated messaging service to provide a confidence level as to whether a particular sender is generating unwanted electronic messages.

In the example provided in FIG. 3, assuming the data structure 300 represents updated information, sender 301A would be unapproved because at least one of the federated services indicates a "0" or that that federated service considers the sender's behavior unsatisfactory, such that such behavior would merit a challenge message. For similar reasons, sender 301B would be unapproved. However, sender 301C is approved because all of the federated messaging services agree on the approved status of the sender.

In one embodiment, the federated messaging services apply a strict analysis of the binary indicators in that if even one of the federated messaging services considers the sender to be unapproved, all federated messaging services should require that sender to be sent a challenge message. However, it will also be appreciated that because federated messaging services may use different criteria upon which to apply the flag, it is possible that the analysis may be relaxed somewhat to allow a less stringent application of analysis. For example, a federated messaging service may allow one of the federated messaging services to consider a particular sender unapproved without sending challenge messages to the sender until two or more federated messaging services deem the sender unapproved.

In one embodiment, all of the federated messaging services use the same rating method to provide consistency across all services. This can assist in ease of implementing the present invention among various federated messaging services and providing guidelines as to what type of behavioral information to send and to store. Where services use the same rating, a user may possibly never receive a challenge message from a federated messaging service.

As suggested above, the method for rating behavioral information can be different for each federated messaging service. For example, one messaging service may allow a particular sender to send up to a total of 1000 email messages to all of the federated messaging services before requiring a challenge message to be sent. Another message service may have a threshold of 1500 combined email messages as the threshold value. Still another messaging service may base behavioral information purely on status indicators. Thus, as illustrated above, depending on how each federated messaging service rates users, a user may receive challenge messages from one service, but not the other. In the case where each messaging service uses a different method for rating senders, behavioral information that is requested may contain both numerical counts as well as status indicator information so that each messaging service will have the required information, even though some of the information may go unused.

3. Exchanging Behavioral Information

As discussed above, behavioral information can be transmitted between federated messaging services in various ways. In one embodiment, electronic messages can be sent to request information and to respond to requests. The response could contain a list of only a particular sender identified by the requesting federated messaging service. Alternatively, the response message could contain a list of any sender who has had any changes since the last request from a federated messaging service. Still, the response message could contain a list of all senders and their current message count or status indicator.

In one embodiment, the request could be automatically generated upon receiving an incoming message. Upon identifying the sender's identification, server 114 could automatically generate a request message wherein the sender's identification is contained in the body of the message. The request message could also contain a token or other identifier that indicates to the federated messaging service to whom the request message is being directed that the request is coming from another federated messaging service. Third parties may be able to intercept a response and forge behavioral information of senders in the message, which would result in inaccurate conclusions as to the behavior of the senders when the information arrives to requesting federated messaging service. Thus, authentication measures can be used to ensure that the requests/response for behavioral information is authentic as coming from a federated messaging service. Authentication techniques can include, but are not limited to, encryption, checksums, hashes, digital signature, and digital certification. Authentication may require communication between the two federated messaging services to exchange encryption keys. The authentication method and/or exchange of keys may require certificating the authenticity thereof using, for example, a certificate authorizing server 150 communicating with a database 152. Once the behavioral information from servers 116, 118 is received, the behavioral evaluation module 128 updates database 140 with new behavioral information. A token to identify federated messaging services can be implemented similar to the one taught in Co-pending U.S. patent application Ser. No. 11/080,240, filed Mar. 15, 2005, herein incorporated by reference.

In embodiments where the sender's domain name is identified in the request message, the database 140, 142 may also contain another data structure organized by domain name which contains pointers or markers to the data structure containing behavioral information. That way, the behavioral evaluation modules 128, 130 can easily determine the sender's behavioral information and generate a response message to the request.

In embodiments where the request message asks for an updated list of any changes in senders, the behavioral evaluation modules 128, 130 may have a data structure that tracks the date and time that a previous request was made by each federated messaging service. In addition, the behavioral evaluation modules 128, 130 may maintain a revolving list of changes of behavioral information. When a federated messaging service makes a request, the behavioral evaluation module 128, 130 identifies the last time that service made a request and retrieves all of the changes in the updated list between the last request and the present request. The behavioral evaluation module 128, 130 then updates the data structure for the federated messaging services and inserts the time of the new request. Advantageously, this allows all updated information to be deleted for times earlier then the oldest request time to minimize the amount of storage required.

Sharing behavioral information between federated messaging services can be done at various times. In one embodiment, behavioral information is requested and sent using real-time communication. Thus, the behavioral evaluation modules 128, 130 request behavioral information on each sender each time an incoming message is received at that federated messaging service. In another embodiment, a less than real-time mechanism can be implemented in which the federated messaging services at periodic intervals send an updated list of behavioral information of senders to the other federated messaging service. Advantageously, this has the advantage of eliminating the requirement for a request for behavioral information since the federated messaging services can anticipate receiving an updated list within a certain amount of time. Preferably, in this embodiment, the federated messaging services would stagger the transmission of updated lists so that a gap would occur in the updating of all of the federated messaging services databases, closing any window of opportunity for would-be spammers. In this embodiment, potential spammers would also likely be identified because it is likely that they would send to many different messaging services and not just one.

In another embodiment, the maintenance and updating of sender behavioral information could be centralized in a server 150 to which all federated messaging services 102, 104 have access. That is, each federated messaging service could continually or periodically send the server 150 a list of changes to behavioral information. Server 150 would include a behavioral evaluation module (not shown) to receive, organize and store information on database 152. The behavioral evaluation module in the server 150 would also respond to requests from federated messaging services 102, 104 for updated behavioral lists so that each federated messaging service could make a determination of whether a sender is approved or unapproved similar to how requests are described above. In addition, if the federated messaging services 102, 104 use the same criteria for determining if a sender is approved, the behavioral evaluation module at server 150 could also apply the uniform criteria across all senders to determine if the sender is approved or unapproved. The server 150 could then respond to a request of whether a sender is approved/unapproved by sending a simple status identifier, such as "1" for approved and "0" for unapproved. Centralizing the storage and analysis of behavioral information may reduce the requests/responses for behavioral information across federated messaging services and could serve to provide uniform criteria for determining when challenge messages should be withheld. Alternatively, the server 150 can use the behavioral information from the federated messaging services to generate a score for each sender. A score gives the federated messaging services the autonomy to determine whether or not to challenge a particular sender.

In still another embodiment, the sender's behavioral information could be embedded in an incoming message generated by the sender, as long as the sender transmits from a federated messaging service. This would eliminate both the need for a request and a response message in order to obtain the sender's behavioral information at least as to that federated messaging service. A request may still need to be made to see how that sender is behaving with respect to other federated messaging services. Thus, for incoming messages generated by federated messaging services, some of the information for these senders can be immediately provided and the receiving federated messaging service can determine what additional updates need to be made. Naturally, where the incoming message is generated by a non-federated messaging service, other methods for transmitting behavioral information described above will be appropriate.

Still, in another method an admissions token can be issued to a sender once the sender has successfully bypassed a challenge/response filtering mechanism at a first federated messaging service. The admissions token can be, for example, a public key, which the sender can include in any messages that are generated by the sender. When received by any federate messaging service, the federated messaging services use the public key to confirm that the sender is an approved sender. Upon this determination, the receiving federated messaging service allows the message into the recipient's inbox without issuing a challenge message.

If a federated messaging service discovers that a sender has never sent an incoming message to any of the federated messaging services, the federated messaging service receiving this first message from the sender may issue a challenge message to ensure that the sender is a human. However, it may also be the case that the federated messaging service allows incoming messages from first time senders to go to the recipient's inbox until the sender proves they cannot be trusted.

4. Exemplary Method

Figure 4:
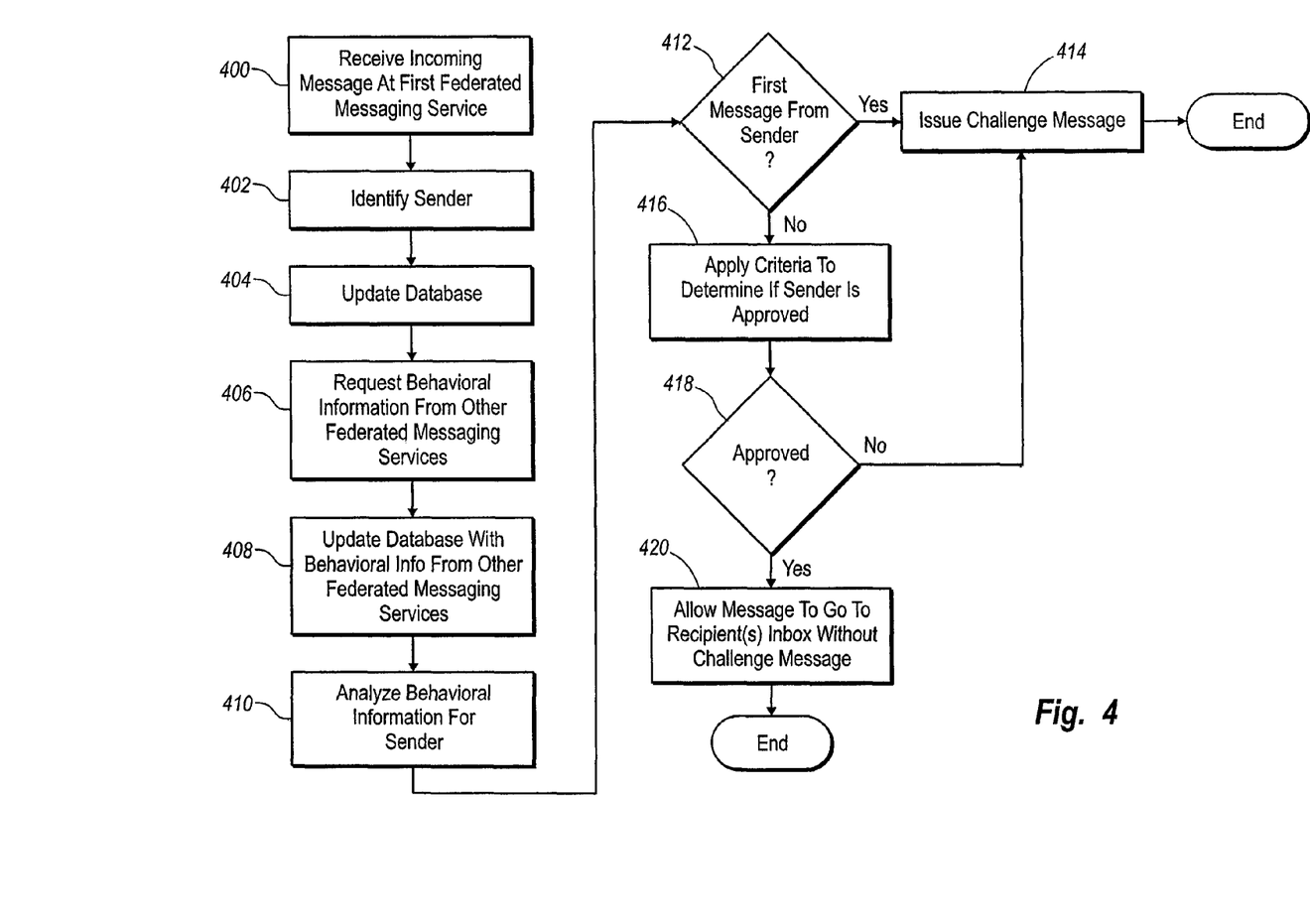
FIG. 4 illustrates an exemplary method for implementing features of the present invention.

While many methods for implementing the features of the present invention have been discussed, FIG. 4 illustrates an exemplary method for implementing certain steps and features of the present invention. Those of skill in the art will appreciate that other steps or features can be added, certain steps can be eliminated, or the steps can be rearranged in a different order. In one embodiment, as illustrated in FIG. 4, at step 400, a server associated with a first federated messaging service receives an incoming message. At step 402, the behavioral evaluation module at the server analyzes the incoming message to identify the sender. At step 404, the behavioral evaluation module accesses a data structure in the database and updates the data structure to reflect the event of receiving an incoming message from the sender. At step 406, the behavioral evaluation module requests updated behavioral information for that sender from at least one other federated messaging service. At step 408, the behavioral evaluation module updates the database with behavioral information once it receives a response to the request.

At step 410, the behavioral evaluation module analyzes the behavioral information stored in the database. At step 412, the behavioral evaluation module determines if this is the first incoming message that the sender has sent to any of the federated messaging services. At step 414, the behavioral evaluation module communicates with the challenge/response module instructing that a challenge message be sent. If this is not the first time that the sender has sent a message to any of the federated messaging services, at step 416, the behavioral evaluation module applies the criteria for determining if the sender is approved or unapproved for that federated messaging service. As discussed above, the criteria may be based on a threshold number of messages received by a sender or a threshold amount in the increase of messages received by the sender or on other criteria. For example, the criteria could be based on the status indicator that each federated messaging service determines for a particular user.

At step 418, the behavioral evaluation module determines, based on it analysis if the sender is approved or unapproved. If the sender is unapproved, the process goes to step 414, where a challenge message is issued. If the sender is approved, at step 420, the behavioral evaluation module communicates with the challenge/response module to withhold a challenge module and allow the incoming message to be sent directly to the recipient's inbox.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   by a first server, storing, in a first database of the first server, first behavioral information about a first plurality of message senders that sent one or more messages to a first electronic messaging service hosted by the first server;
   by a second server, storing, in a second database of the second server, second behavioral information about a second plurality of message senders that sent one or more messages to a second electronic messaging service hosted by the second server;
   by the first server, sharing at least a portion of first behavior information about the first plurality of message senders with the second server;
   by the second server, updating the stored second behavioral information about the second plurality of message senders based on the shared portion of first behavior information about the first plurality of message senders;
   by the second server, sharing at least a portion of second behavior information about the second plurality of message senders with the first server;
   by the first server, updating the stored first behavioral information about the first plurality of message senders based on the shared portion of second behavior information about the second plurality of message senders;
   by the first server, storing, in the first database of the first server, an approval status for each message sender of the first plurality of message senders based on the updated first behavioral information;
   by the second server, storing, in the first database of the first server, an approval status for each message sender of the second plurality of message senders based on the updated second behavioral information;
   by the first server, receiving an incoming electronic message from a first message sender that is among both the first plurality of message senders and the second plurality of message senders;
   by the first server, in response to receiving the incoming electronic message from the first message sender:
      evaluating a first binary indicator representing a first approval status for the first sender in the first electronic messaging service hosted by the first server;
      evaluating a second binary indicator representing a second approval status for the first sender in the second electronic messaging service hosted by the second server; and
      based on the evaluation of the first binary indicator and the evaluation of the second binary indicator, determining that the first sender is approved by the first electronic messaging service and disapproved by the second electronic messaging service.

2. The method as in claim 1, further comprising:
   by the first server, in response to determining that the first sender is approved by the first electronic messaging service and disapproved by the second electronic messaging service:
      communicating with a challenge/response module associated with a recipient's inbox to prevent a challenge message from being sent to the first sender and allowing delivery of the incoming electronic message to the recipient's inbox.

3. The method as in claim 1, further comprising:
   by the first server, in response to determining that the first sender is approved by the first electronic messaging service and disapproved by the second electronic messaging service:
      communicating with a challenge/response module associated with a recipient's inbox to initiate a challenge message in response to the incoming electronic message.

4. A system comprising:
   a first server configured to:
      store, in a first database of the first server, first behavioral information about a first plurality of message senders that sent one or more messages to a first electronic messaging service hosted by the first server; and
      store, in the first database of the first server, an approval status for each message sender of the first plurality of message senders based on the first behavioral information; and a second server configured to:
> store, in a second database of the second server, second behavioral information about a second plurality of message senders that sent one or more messages to a second electronic messaging service hosted by the second server; and
> store, in the second database of the second server, an approval status for each message sender of the second plurality of message senders based on the second behavioral information;

wherein the first server is further configured to:
> receive a first incoming electronic message from a first message sender that is among both the first plurality of message senders and the second plurality of message senders; and
> determine that the first sender is approved by the first electronic messaging service and disapproved by the second electronic messaging service.

5. The system as in claim 4, wherein the first server is further configured to:
> in response to determining that the first sender is approved by the first electronic messaging service and disapproved by the second electronic messaging service:
> communicate with a challenge/response module associated with a recipient's inbox to prevent a challenge message from being sent to the first sender and allowing delivery of the incoming electronic message to the recipient's inbox.

6. The system as in claim 4, wherein the first server is further configured to:
> in response to determining that the first sender is approved by the first electronic messaging service and disapproved by the second electronic messaging service:
> communicate with a challenge/response module associated with a recipient's inbox to initiate a challenge message in response to the incoming electronic message.

7. The system as in claim 4, wherein the first server is further configured to share at least a portion of first behavior information about the first plurality of message senders with the second server; and wherein the second server is further configured to update the stored second behavioral information about the second plurality of message senders based on the shared portion of first behavior information about the first plurality of message senders.

8. The system as in claim 7, wherein the second server is further configured to share at least a portion of second behavior information about the second plurality of message senders with the first server; and wherein the first server is further configured to update the stored first behavioral information about the first plurality of message senders based on the shared portion of second behavior information about the second plurality of message senders.

* * * * *